(12) United States Patent
Chausset

(10) Patent No.: US 6,394,695 B1
(45) Date of Patent: May 28, 2002

(54) FIXING CLIP

(75) Inventor: Francois Chausset, Saint Maur (FR)

(73) Assignee: Möllertech SAS, LeBuisson (FR)

( * ) Notice: Subject to any disclaimer, the term of this patent is extended or adjusted under 35 U.S.C. 154(b) by 0 days.

(21) Appl. No.: 09/485,923

(22) PCT Filed: Jun. 23, 1999

(86) PCT No.: PCT/FR99/01503

§ 371 (c)(1),
(2), (4) Date: Feb. 18, 2000

(87) PCT Pub. No.: WO99/67542

PCT Pub. Date: Dec. 29, 1999

(30) Foreign Application Priority Data

Jun. 23, 1998 (FR) .............................. 98 07893

(51) Int. Cl.[7] .................................. F16B 2/22
(52) U.S. Cl. ...................... 403/397; 248/71; 248/74.3
(58) Field of Search ......................... 248/71, 73, 74.3, 248/74.1; 403/353, 328, 326, 329, 354, 397

(56) References Cited

U.S. PATENT DOCUMENTS

| 2,896,889 A | * | 7/1959 | Hershberger et al. ......... 248/71 |
|---|---|---|---|
| 2,937,834 A | * | 5/1960 | Orenick et al. ................ 248/71 |
| 2,995,328 A | * | 8/1961 | Whitted ........................ 248/71 |
| 3,144,695 A | * | 8/1964 | Budwig ............... 248/374.3 X |
| 3,169,004 A | * | 2/1965 | Rapata .......................... 248/71 |
| 3,275,969 A | * | 9/1966 | Sheeran ................. 248/74.3 X |
| 3,465,992 A | * | 9/1969 | Schuplin ....................... 248/71 |
| 3,758,060 A | * | 9/1973 | Schuplin .................... 248/74.3 |
| 4,143,577 A | * | 3/1979 | Eberhardt .................... 248/71 |
| 4,342,438 A | * | 8/1982 | Speedie ........................ 248/73 |
| 4,674,910 A | * | 6/1987 | Hayashi .................... 248/73 X |
| 4,865,280 A | * | 9/1989 | Wollar .................. 248/74.1 X |
| 5,690,038 A | * | 11/1997 | Merit et al. ............. 403/397 X |
| 5,758,987 A | | 6/1998 | Frame et al. ................ 404/298 |

FOREIGN PATENT DOCUMENTS

| DE | 1 910 167 | 10/1969 |
|---|---|---|
| FR | 2 351 296 | 12/1977 |

* cited by examiner

Primary Examiner—Lynne H. Browne
Assistant Examiner—David E. Bochna
(74) Attorney, Agent, or Firm—Duane Morris LLP

(57) ABSTRACT

A clip for fixing trim on a support comprises a first male portion suitable for being snap-fastened in an opening of the support and connected by a strap to a female piece that is suitable for snap-fastening on a second male portion of the clip, a piece being suitable for being assembled on the piece by sliding.

4 Claims, 2 Drawing Sheets

FIXING CLIP

The present invention relates to a fastening clip intended particularly, but not exclusively, for fastening pieces made of thermoplastic material and provided with such clips onto metal pieces, particularly in vehicle construction, for the purpose of fixing plastic internal trim onto bodywork.

BACKGROUND OF THE INVENTION

Traditionally, such fasteners are made by means of discrete add-on elements such as rivets, plastics clips, or screws where the thread is engaged in a hole or an opening in the metal or plastics support and where the head holds captive the plastics piece that is to be secured. Although that kind of assembly is easy to disassemble, it is expensive because it leads to additional tooling being made. Furthermore, a large amount of labor time is required to perform such fixing by means of add-on elements.

When the inside of a car is fitted with a lateral air bag for the head, it is necessary to retain the interior trim after the bag has inflated so that the trim does not constitute a projectile which could injure an occupant of the cabin. More generally, it is advantageous to be able to retain a piece after it has been unclipped.

OBJECTS AND SUMMARY OF THE INVENTION

An object of the present invention is to mitigate the drawbacks of known clips and to enable a previously-clipped piece to be retained after it has been unclipped.

The invention provides a plastics material clip for fastening a piece onto a support, in particular a metal support, the clip comprising on a base: a first male portion snap-fastenable in an opening, a second male portion extending in line with the first portion, a flexible strap secured to the base and connecting it to a female piece that is snap-fastenable on said second male portion. The female piece that is snap-fastenable on the top portion of the fastener is also provided with assembly means for engaging a female piece secured to the trim.

In another characteristic of the invention, the bottom portion of the clip comprises a shank having two walls projecting from the bottom end thereof in a V-shape with the free ends of the walls presenting snap-fastening tips which come into contact with the edges of the hole so as to provide firm resistance to traction.

The flexibility of the plastics material makes it possible to insert the bottom portion of the clip in the orifice and to retract the projecting tips until the clip occupies a predefined position in which the sheet metal, or more generally the support, is clamped between the base of the fastener and the snap-fastening tips.

In the invention, the base with its folded-down edges makes it possible to change the position of sharp zones. The flanges of the V-shaped clip can thus slide on the edges of the support without being injured, enabling the clip to take up its final position.

Said pieces need to be dismantled only occasionally as a function of particular problems. The thermoplastic material constituting the clip is thus selected in such a manner as to be capable of being subjected without damage to a score of assembly and disassembly operations.

BRIEF DESCRIPTION OF THE DRAWINGS

Other characteristics and advantages of the present invention will appear on reading the following description of a particular embodiment, given purely by way of non-limiting example and with reference to the figures, in which.

MORE DETAILED DESCRIPTION

Figure 1:
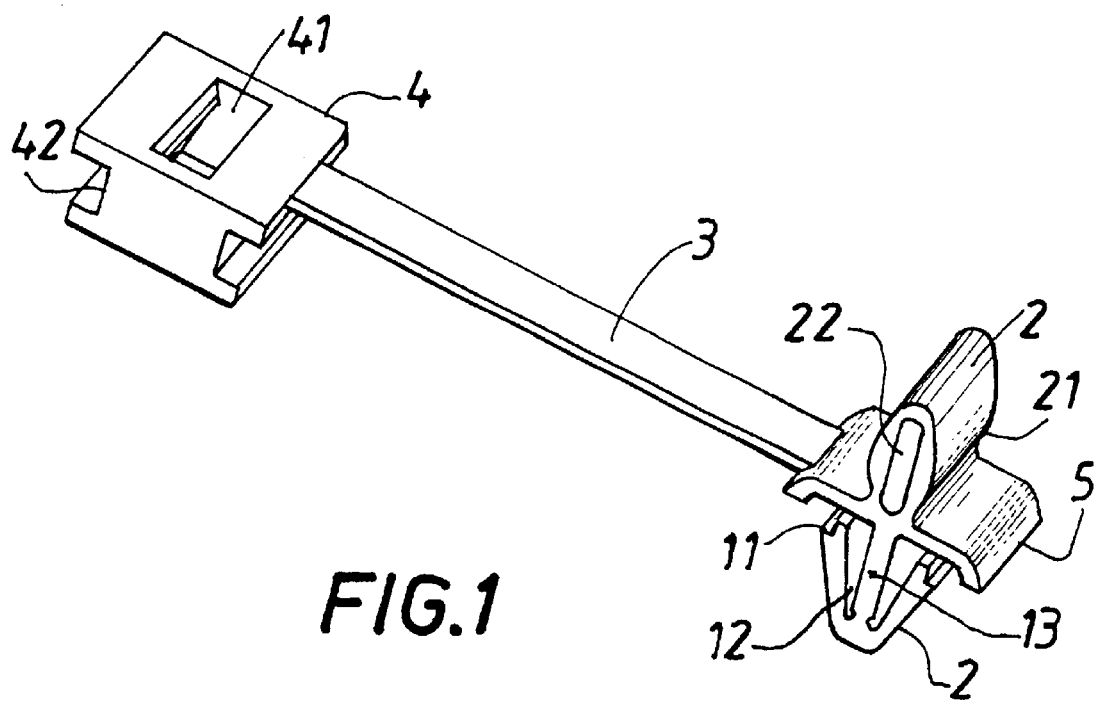
FIG. 1 is a perspective view of a clip of the invention.

In FIGS. 1 to 5, the same references designate the same elements. In FIG. 1, there can be seen a clip which is injected-molded out of a plastics material and which comprises a base 5 from which a first portion 1 projects downwards for the purpose of being snap-fastened in an opening in bodywork. In the example shown, this portion is anchor-shaped, comprising a shank 13 having two walls 12 projecting in a V-shape from its free end, which walls are moved towards each other during insertion through a hole and then return to their original shape after they have passed through the hole. The free ends of the walls 12 have snap-fastening tips 11 which come into contact with the edges of the hole or opening so as to provide good resistance to extraction.

Starting from the base and in line with the shank 13, there projects a second portion 2 that is generally oval in shape, being made up of two walls 21 which together form an axially-extending hole 22, thereby giving this portion a certain amount of resilience in a transverse direction. The base 5 is plane and its side edges are preferably curved towards the portion 1.

Starting from one of the sides of the base 5, there extends a flexible tape or strap 3 whose other end is secured to a piece 4. The piece 4 is substantially rectangular in shape and has an orifice 41 in its central portion, which orifice is generally frustoconical in shape, and is of dimensions enabling the piece 4 to be snap-fastened on the portion 2 of the clip. The sides of the piece 4 present two slideways 42 for enabling the piece 4 to be assembled with a corresponding piece 6 which is secured to the trim in the manner described below.

Figure 2:
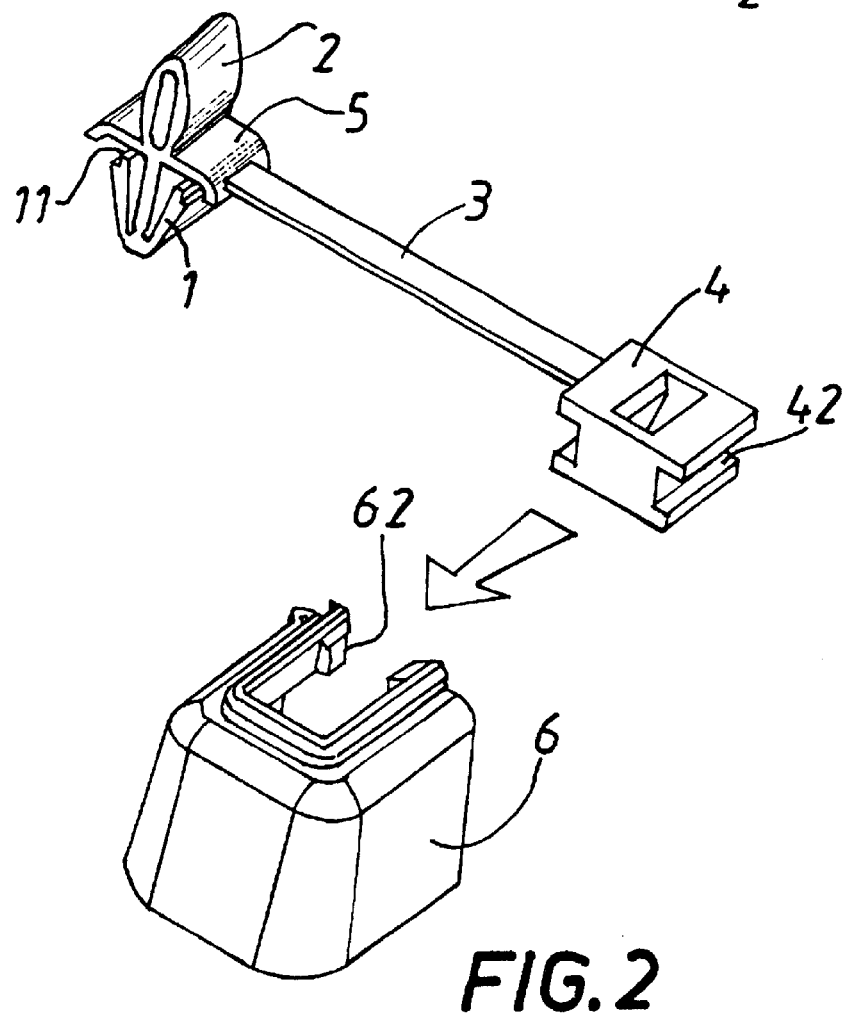
FIG. 2 is a perspective view showing the clip of FIG. 1 being assembled with a piece linked to the trim that is to be held.
Figure 3:
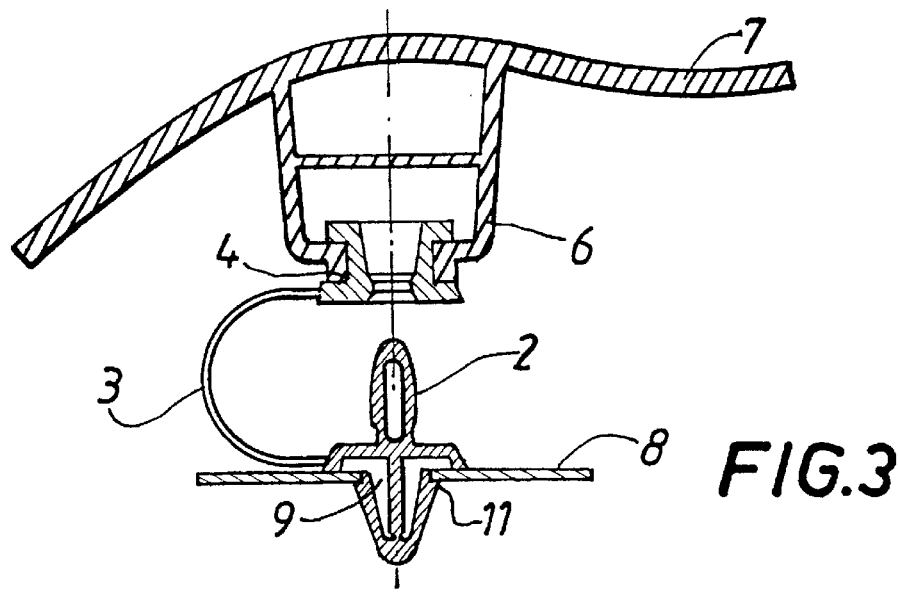
FIG. 3 is a section view through a piece of trim assembled with a clip of the invention.

The piece 6 is shown in FIG. 2, and as shown it presents two tenons 62 in its bottom portion (the figure is upside-down) designed to slide in the slideways 42 of the piece 4. When mounting trim on the bodywork of a car, the piece 6 is integral with the trim as can be seen in FIG. 3. This figure shows the pieces as described above in a preassembly position. I.e., the clip 1, 2 has been snap-fastened in an opening 10 in the bodywork 7. The flexible strip 3 has been folded throughout 90° back onto itself so that the piece 4 can be snap-fastened on the portion 2 of the clip by being moved downwards in the figure. The piece 6 is integral with the trim 7 and has been slid along the grooves 42 in the piece 4.

Figure 4:
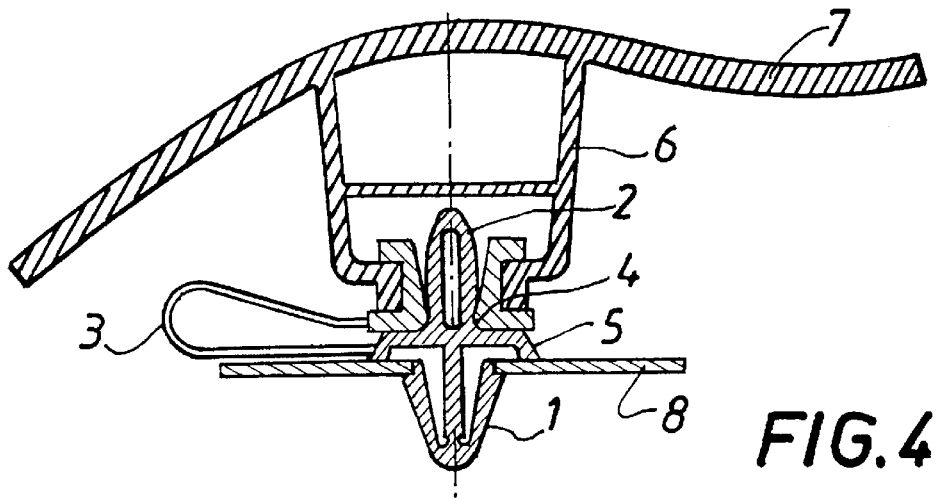
FIG. 4 is a section view showing the clip and the trim assembled to the bodywork.

FIG. 4 shows the clip and the trim 7 assembled to the bodywork 8, i.e. the various elements are shown in the positions they occupy in normal use. The clip is held to the bodywork by the portion 1 with its snap fastenings tips 11, and the trim is held to the clip by the link between the piece 6 and the piece 4, the piece 4 being held on the portion 2 of the clip. By an appropriate selection of materials, this provides sufficient strength to ensure that the trim is held in place under conditions of normal use.

Figure 5:
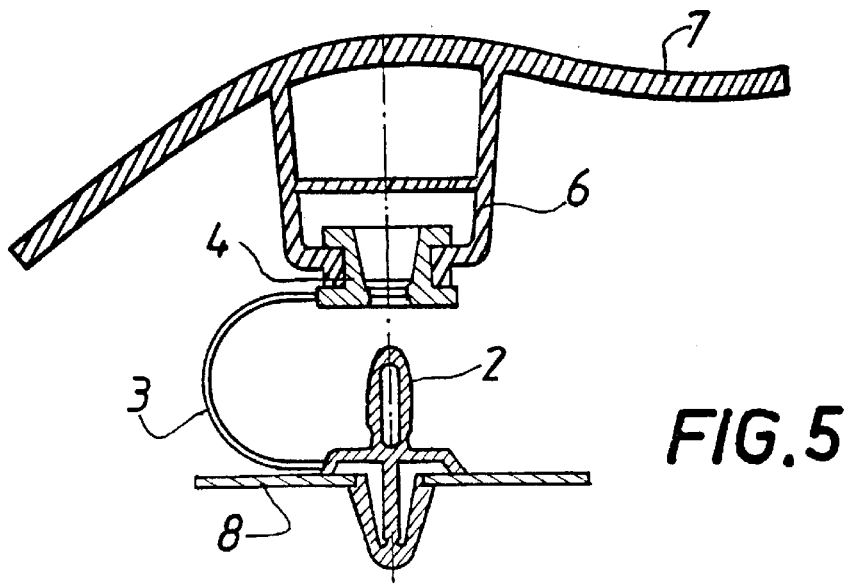
FIG. 5 is a section view showing the trim partially released from the bodywork.

However if it is necessary to remove the trim 7, e.g. for the purpose of replacing it, then it is easily dismantled by exerting sufficient traction on the trim as shown in FIG. 5. Since the strength of the connection between the piece 4 and the piece 2 is weaker than that between the clip and the bodywork, this traction causes the piece 4 to become unclipped from the portion 2 of the clip, and the tape 3 then makes it possible to establish a gap between the trim 7 and the clip. This gap makes it possible either to cause the piece 6 of the trim 7 to slide along the piece 4, or else merely to cut through the tape 3. It is then possible to turn the clip through 90° so as to be able to disengage it from the opening 9 since, in the example shown, the opening and consequently the clip are both rectangular.

Although the above description is given using as an example a clip having two flanges for penetrating in a rectangular cutout, the same structure could naturally be used with a clip that is square or circular in shape. Similarly, although it is economically advantageous for the pieces 6 to be integral with the trim, it is clear that they could be constituted by discrete elements or invisible fastenings and that numerous variants can be provided, in particular by substituting equivalent technical means, without thereby going beyond the ambient of the invention.

What is claimed is:

1. A plastic clip for fastening a trim on a support with a plurality of openings, said clip comprising:

a base having a first male portion for snap-fastening on one of said plurality of openings of said support and a second male portion extending opposite said first male portion;

a flexible strap with two ends, the first end being secured to said base and the second end being secured to a female piece that is snap-fastenable on said second male portion, said trim being connectable to said female piece, wherein said flexible strap remains unstretched after snap-fastening on the said first male portion inside the support and snap-fastening on the female piece on said second male portion;

wherein the second male portion is generally oval in shape and comprises two walls forming an axially extending hole giving resiliency in a transverse direction.

2. A clip according to claim 1 wherein said female piece comprises a frustoconical orifice for snap-fastening on said second male portion.

3. A clip according to claim 1 wherein said trim is connectable to said female piece by means comprising a slideway defined in said female piece to receive a tenon of the trim.

4. A clip according to claim 1 wherein the first male portion is anchor shaped and comprises a shank having two walls projecting from a free end of the shank, said walls being resiliently movable towards each other during insertion of the first male portion through one of said openings, an upper part of said walls forming snap-fastening tips such that when said first a male portion is inserted in said opening said tips come into contact with edges of the opening to resist extraction.

\* \* \* \* \*